United States Patent [19]

Kalvaitis

[11] 4,142,078

[45] Feb. 27, 1979

[54] COMPACT MOUNTING ASSEMBLY FOR ELECTRICAL SWITCHING ELEMENTS

[75] Inventor: Arvydas J. Kalvaitis, Northbrook, Ill.

[73] Assignee: S & C Electric Co., Chicago, Ill.

[21] Appl. No.: 837,238

[22] Filed: Sep. 27, 1977

[51] Int. Cl.² ............................................ H01H 31/02
[52] U.S. Cl. .................................. 200/48 R; 361/332
[58] Field of Search ............ 200/48 R, 48 KB, 146 R;
361/331, 332, 334, 335; 248/19

[56] References Cited

U.S. PATENT DOCUMENTS

| | | | |
|---|---|---|---|
| 2,816,985 | 12/1957 | Lindell | 200/146 R X |
| 3,571,543 | 3/1971 | Perkins et al. | 200/146 R X |
| 3,673,360 | 6/1972 | Pahl | 200/48 R |
| 3,769,477 | 10/1973 | Chabala et al. | 200/146 R |

Primary Examiner—Herbert F. Ross
Attorney, Agent, or Firm—John D. Kaufmann

[57] ABSTRACT

A mounting assembly for electrical switching elements oppositely mounts together the switching elements in a pair. Each switching element, which may be a high-voltage fuse, a disconnect blade, or the like, has a first and a second support point. A central support, which may be dihedral, mounts two insulators, the free ends of which extend away from each other. The free ends are attachable to the first support point on respective switching elements. A third insulator is mounted to the support opposite from the other two insulators so that a free end thereof is generally oppositely directed from the other insulators, producing a "Y" configuration. The end of the third insulator is attachable to the second support point on both switching elements. The assembly permits both compact, opposed mounting of a pair of switching elements, as well as one less insulator than used in typical mounting assemblies.

31 Claims, 5 Drawing Figures

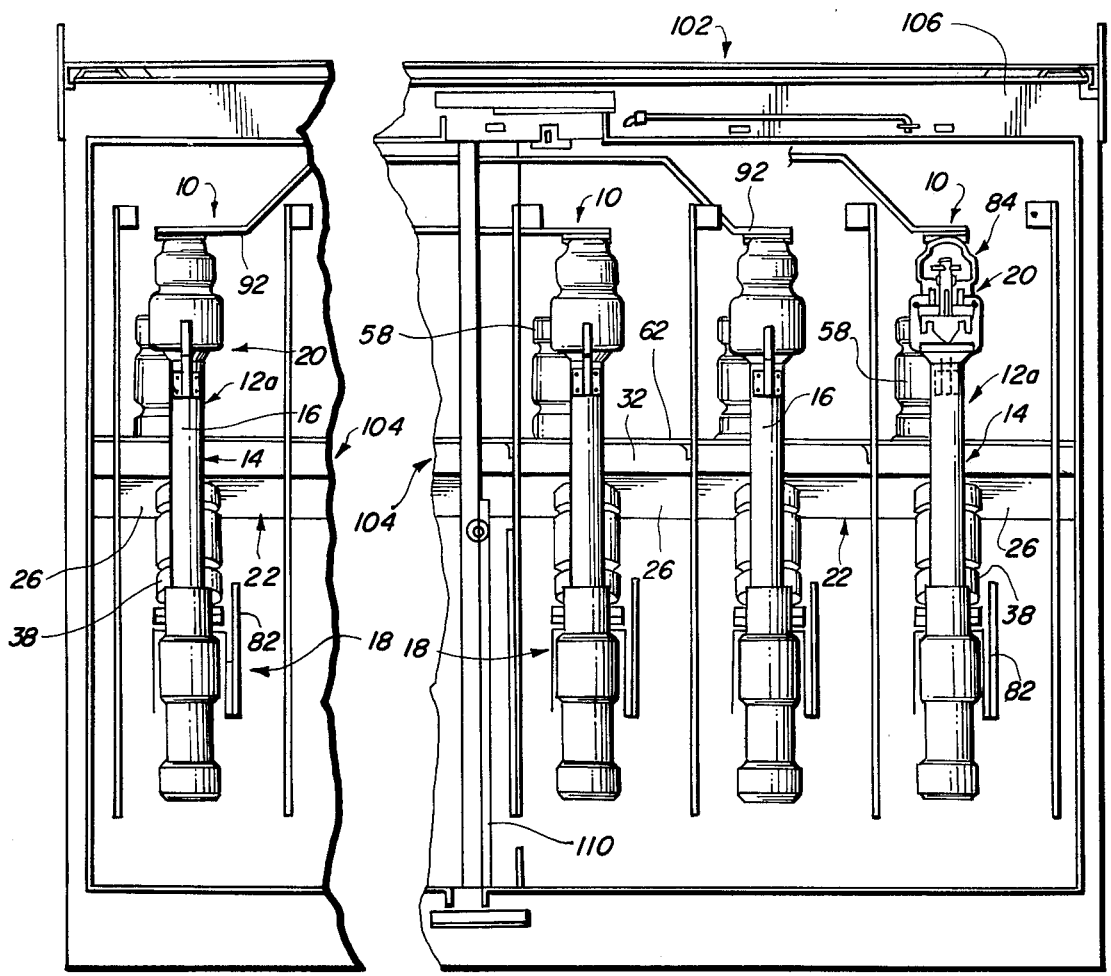
FIG-2
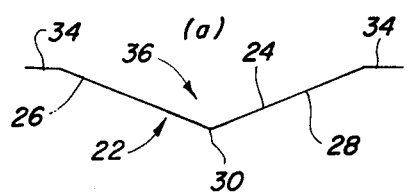
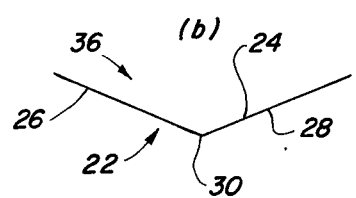
FIG-5
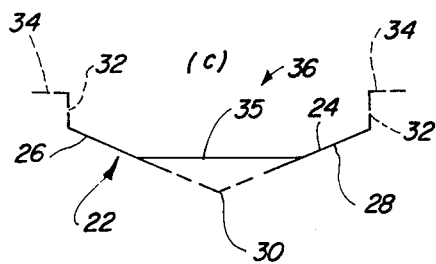
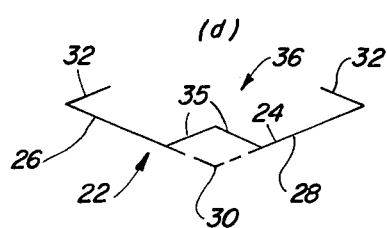

COMPACT MOUNTING ASSEMBLY FOR ELECTRICAL SWITCHING ELEMENTS

BACKGROUND OF THE INVENTION

1. Field of the Invention

The present invention relates to a mounting assembly for electrical switching elements, and more particularly, to an improved mounting assembly for mounting together a pair of opposed switching elements, typically high-voltage fuses or disconnect blades, each pair of elements being supported by only three insulators instead of the usual four insulators.

2. Description of the Prior Art

Numerous mounting assemblies for electrical switching elements are well known. While the configuration of such mounting assemblies widely varies, the majority of them have a common characteristic, namely, for each element so mounted, two insulators are utilized. Generally speaking, a first insulator is connected between a first support point on a first element and a structural base. A second insulator is connected between a second support point on the element and the same or a different base. Where it is desirable to oppositely mount pairs of elements, it is generally the case that each element utilizes two insulators. Accordingly, each oppositely mounted pair of elements utilizes four insulators. All of the above is true whether the switching elements are mounted within an enclosure or not.

In an enclosure, where the utilization of space and alignment of the switching elements is crucial, prior art mounting assemblies exhibit at least three deficiencies. The first deficiency is related to the cruciality of spacing and alignment. With each element having two support points (a total of four) and with each support point being mounted to an insulator (also a total of four), the chance of misalignment of any one of the insulators and, accordingly, of any one of the support points of the elements is rather great. Additionally, prior art assemblies using four insulators per device require rather large amounts of space, which may cause difficulty if the devices are to be in an enclosure. A second deficiency occurs when prior art mounting assemblies are used to mount elements in an enclosure, having cramped quarters. Specifically, when four insulators must be attached at four different places in the cramped enclosure for each pair of elements, much labor cost is expended. A third deficiency in prior art switching element mounting assemblies, within an enclosure or not, is cost- and labor-related. Specifically, and as a general rule, it may be stated that the more insulators used to mount switching elements, the greater will be the final assembly cost, due to both material usage and labor expenditure.

BRIEF SUMMARY OF THE INVENTION

Thus, one object of the present invention is to provide a compact electrical switching element mounting assembly which uses fewer insulators than prior art assemblies, in which proper location of the elements is more easily achieved, thus decreasing both the labor and material costs for such mounting assemblies, and in which space is more efficiently utilized.

Another object of the present invention is to provide an improved assembly for oppositely mounting together pairs of electrical switching elements, such as high-voltage fuses or disconnect blades, which is more inexpensively and more easily and accurately achieved than hitherto known.

With these and other objects in view, the present invention relates to a mounting assembly for electrical switching elements. Each element has a first and a second support point. The assembly of the invention includes a central support member. A first insulator is adapted to partially support one of the elements of the pair. This first insulator has a first end mounted to the central support member. A second end of the first insulator extends away from the central support member. The first support point on the one element is attachable to the second end of the first insulator. A second insulator is adapted to partially support the other element. The second insulator has a first end mounted to the central support member, and a second end extending away therefrom. The second end of the second insulator is attachable to the first support point on another element. A third insulator is adapted to partially support both elements. The third insulator has a first end mounted to the central support member diametrically remote from the first ends of the first and second insulators. A second end of the third insulator extends away from the central support member in a direction different from the direction of extension of the second ends of the first and second insulators. The second end of the third insulator is attachable to the second support point on both of the elements. The three insulators generally define a Y-, T-, or arrow-shaped configuration. Because there is one less insulator than in prior art schemes, the cost of mounting the electrical switching elements is decreased and proper alignment of the elements is more easily achievable because there are fewer mechanical connections. Moreover, the compact mounting of the elements about a central support member leads to more efficient space utilization.

In preferred embodiments, the mounting assembly mounts together in opposed fashion a pair of switching elements. In the preferred assembly, the central support member is a dihedral member having a pair of angularly-related planar faces to which the first and second insulator second ends are mounted. The first and second insulator ends preferably diverge and the third insulator second end extends in a direction generally diametrically opposite to the direction of extension of the second ends of the first and second insulators. Moreover, the lines between the first and second ends of the three insulators generally define a "Y" (which may be symmetrical), the elements are preferably (but not necessarily) high-voltage fuses, and connected between the second support points and the second end of the third insulator may be oppositely-directed interrupters. The fuses may be mounted at their first support points to the second ends of the first and second insulators by hinge mountings, which permit their rotation away from the interrupters. Rotation of the fuses away from the interrupters results in circuit interruption due to the operation thereof. The interrupters may be mechanically and electrically interconnected. A cluster of the assemblies may be provided for similar, side-by-side mounting of a plurality of pairs of the fuses. In this event, it is preferred that each pair of fuses has a similar orientation, the fuses being generally vertical with their hinge mountings lowermost. This similar orientation may result from using an elongated dihedral channel member, which is common to each fuse pair, and to which the first, second, and third insulators of each fuse pair are mounted. The cluster of assemblies adapted to mount a plurality of side-by-side fuse pairs may be located in a housing by appropriate facilities.

BRIEF DESCRIPTION OF THE DRAWINGS

FIG. 2 is a front elevation of a plurality of element pairs in a preferred embodiment of a mounting assembly therefor;

FIG. 5 is a side elevation of a part of the assembly of FIG. 1, showing alternative embodiments thereof.

DETAILED DESCRIPTION OF THE INVENTION

Figure 1:
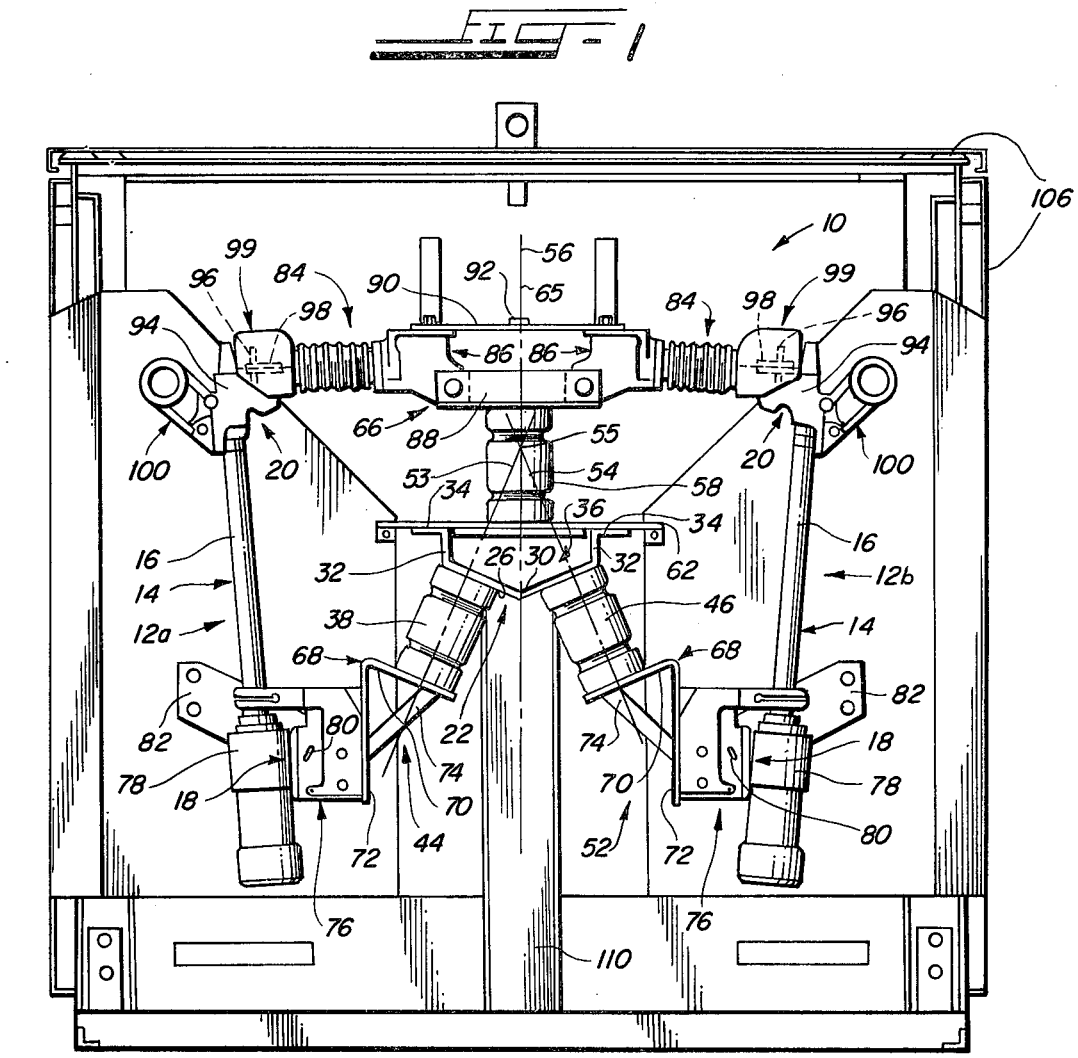
FIG. 1 is a side elevational view of a pair of electrical switching elements and a mounting assembly therefor according to the principles of the present invention.
Figure 3:
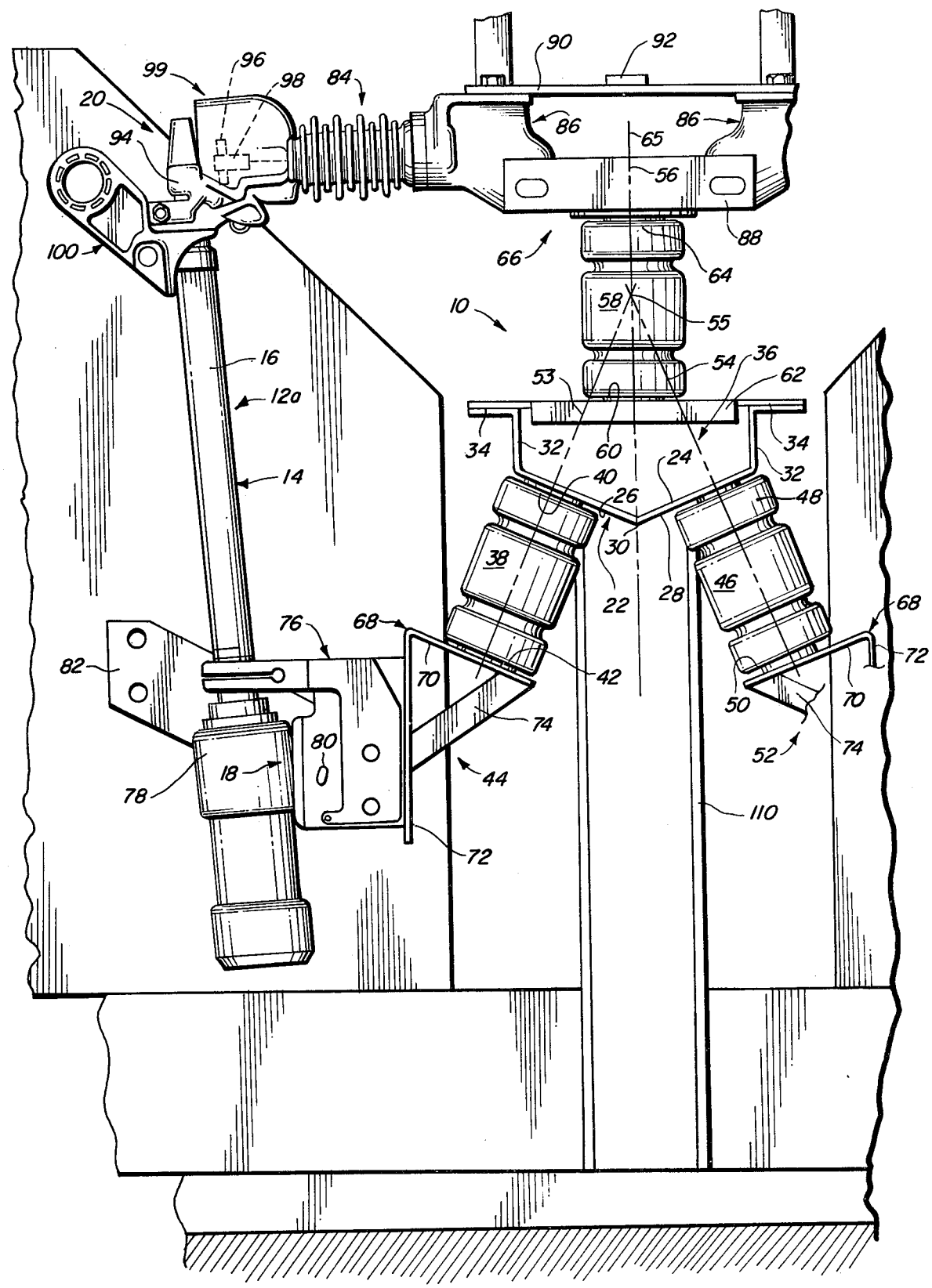
FIG. 3 is an enlargement of a portion of FIG. 1.

Referring first to FIGS. 1 and 3, there is shown a mounting assembly 10 for mounting together in opposed fashion a pair of electrical switching elements, generally indicated at 12. The elements 12 do not themselves form a part of the present invention, as the assembly 10 may be manufactured and sold separately therefrom.

The switching elements 12 may take any conventional form, and may be high-voltage fuses of the disconnect or non-disconnect variety, disconnect blades or the like. A preferred element 12 is a high-voltage disconnect fuse 14, which is more completely described in commonly-assigned, co-pending patent application, Ser. No. 740,930, filed 11-11-76. The fuses 14 comprise a general elongated body 16 which contains circuit interrupting facilities (not shown) for interrupting a circuit in the event of an over-current through the fuse 14. Each fuse 14 has a first support point 18, described in more detail subsequently. Each fuse 14 also has a second support point 20, also described in more detail below. Where elements 12 other than the fuses 14 are used, they too have first and second support points 18 and 20.

The mounting assembly 10 includes a central support member 22 which may take the preferred form of the dihedral member 24 shown. Central support members 22, having varying configurations, are also contemplated, as will be evident subsequently.

In its preferred form, the dihedral member 24 includes two similar planar faces or major surfaces 26 and 28, joined together along a line of intersection 30, seen on end as a point in FIGS. 1 and 3. The lateral end of each face 26 and 28 has attached thereto a generally upstanding wall member 32, the wall members 32 having generally horizontal, coplanar flanges 34 respectively attached thereto.

The dihedral member 24 may take other forms, as shown in FIGS. 5(a)-5(d). Specifically, in FIG. 5(a), the wall members 32 are eliminated and the planar faces 26 and 28 have the flanges 34 connected directly thereto. In FIG. 5(b), there is shown a dihedral member 24 which has the planar faces 26 and 28, but which has neither the wall members 32 nor the flanges 34. Moreover, the dihedral member 24 need not be formed from actually intersecting planar faces 26 and 28, as shown in FIGS. 5(c) and 5(d). Specifically, it is permissible and within the scope of the definitions of the central support member 22 and the dihedral member 24 as used herein, to use two separate planar members with or without the walls 32 or flanges 34. The members are angularly related to each other, as by straight or bent structural tie pieces 35 [FIGS. 5(c) and 5(d)], but not joined along the line of intersection 30. In this latter event, the intersection line 30 is virtual, not actual, but the planar faces 26 and 28 will function similarly to the dihedral member 24, as described below.

The dihedral member 24, or alternative configurations of the central support 22, may be made from a single piece of formed structural sheet metal or the like, or may constitute separate pieces fastened together as by welding, brazing, or connectors. The dihedral member 24 has an interior 36 wherein the angle of intersection of the faces 26 and 28 at the line 30 is less than 180°. The angle of intersection between the planar faces 26 and 28 is greater than 180° on the exterior of the dihedral member 24.

A first insulator 38 has a first end 40 thereof mounted to one of the planar faces 26. A second end 42 of the first insulator 38 extends away from the planar face 26. The second end 42 of the first insulator 38 is attachable to the first support point 18 on one of the switching elements 12a by attachment facilities 44, carried thereby and described in more detail below.

A second insulator 46 has a first end 48 mounted to the other planar face 28. A second end 50 of the second insulator 46 extends away from the planar face 28 and carries thereon facilities 52 attachable to the first support point 18 of the other device 12b.

The first and second insulators 38 and 46 may be mounted to the planar faces 26 and 28 by any conventional means, such as bolts or other fasteners. The insulators 38 and 46 may be made of porcelain or other insulating materials, such as cycloaliphatic epoxy resins, which have the requisite mechanical and electrical properties for use with high-voltage elements. Preferably, the insulators 38 and 46 are, but need not necessarily be, elongated bodies. It is also preferred that the imaginary lines 53 and 54 drawn between the first and second ends 40 and 42 of the first insulator 38, and the first and second ends 48 and 50 of the second insulator 46, are normal or perpendicular to the respective planar faces 26 and 28. Moreover, it is preferred that these imaginary lines 53 and 54 diverge from a common point 55 in or near the interior 36 and on the bisector 56 of the angle of intersection between the faces 26 and 28.

A third insulator 58 has a first end 60 mounted to the dihedral member 24. A preferred way of effecting such mounting is to attach to the dihedral member 24, by any conventional means, a plate-like member 62 which spans or bridges the interior 36 of the dihedral member 24, as shown in FIGS. 1 and 3. In this preferred arrangement, the first end 60 of the third insulator 58 is mounted by any convenient means, such as bolts or other connectors, to the member 62. The mounting of the first end 60 of the third insulator 58 to the dihedral member 24 is diametrically remote from the first ends 40 and 48 of the first and second insulators 38 and 46, as well as being diametrically remote from the planar faces 26 and 28. A second end 64 of the third insulator 58 extends away from the dihedral member 24 in a direction which is generally diametrically opposite from the direction of extension of the second ends 42 and 50 of the first and second insulators 38 and 46. It is preferred that an imaginary line 65, drawn between the first and second ends 60 and 64 of the third insulator 58, be an extension of the bisector 56. Thus, as shown in FIG. 1, the insulators 38, 46 and 58 define a symmetrical "Y". Although FIG. 1 depicts the "Y" in an inverted position, it may take any orientation desired. Moreover, the "Y" need not be symmetrical, as should by apparent, and may be a "T" or an arrowhead.

Carried by the second end 64 of the third insulator 58 are facilities 66 by which the second end 64 is attachable to the second support points 20 of both devices 12. These facilities 66 are described subsequently.

The mounting assembly 10, as described generally to this point, is useful for compactly mounting pairs of devices 12 in the opposed fashion shown in FIGS. 1 and 3. Such mounting effects savings in both material and labor costs, and facilitates ease of accurate mounting. Specifically, as can be seen, the assembly 10 has one less insulator than normal mounting assemblies, only three insulators 38, 46 and 58 being used to mount two devices 12. Moreover, the insulators 38, 46 and 58 being so commonly, closely and compactly located near each other on the central support member 22 that accurate alignment thereof, and accordingly of the devices 12 supported thereby, is greatly facilitated. It is to be understood that the description to this point relates to the present invention in its broadest aspects, as reflected in the broadest claims hereof. Subsequent description relates to specific preferred embodiments which is to be deemed to in no way limit these broader aspects of the invention.

In the preferred embodiment, the facilities 44 and 52 are similar and only one is described herein, the same reference numerals being used to identify identical parts. Referring to FIGS. 1 and 3, the facilities 44 and 52 include, attached to the second ends 42 and 50 of the first and second insulators 38 and 46, a metal angle piece 68 which includes a first leg 70 and a second leg 72. The legs 70 and 72 may be structurally stabilized by the crosspiece 74 shown which is attached thereto by any convenient means, as by welding. The first leg 70 of the angle piece 68 is attached to the second end 42 or 50 by any conventional means, such as bolts or other fasteners, parallel to its respective planar face 26 or 28. The second leg 72 is preferably generally parallel to the bisector 56. The legs 70 and 72 may have other orientations with respect to each other and with respect to other parts of the mounting assembly 10, as should be apparent. Attached to the second leg 72 by conventional means is a lower mounting 76 of any well-known construction. In the preferred embodiment, the elements 12 are fuses 14 having a lower end fitting 78 with one or more pins 80 or the like thereon, and the lower fuse mounting 76 rotatably engages the pin 80 and other portions of the lower end fitting 78. The reverse is also contemplated, i.e., the lower mounting 76 may have a hinge pin rotatably engaged by the lower end fitting 78. In any event, the lower fuse mounting 76 may contain terminals 82 for connecting one side of the fuse 14 to an electrical circuit.

Preferred facilities 66 for mounting the second end 64 of the third insulator 58 to the second support point 20 of the devices 12 are, in part, more completely described in co-pending, commonly-assigned patent patent application, Ser. No. 660,872, filed on 2-24-76. These facilities 66 are only generally described here. The facilities 66 are similar; only one is described, similar reference numerals being used to denote identical parts.

The facilities 66 include a hard-gas interrupter 84 of the type described in the co-pending patent application referred to immediately above. A first end 86 of each interrupter 84 is connected to one or more strips 88, which may be conductive and which may mechanically and electrically interconnect the interrupters 84. One of the strips 88 is mechanically connected to the second end 64 of the third insulator 58 by bolts or other conventional fasteners, as shown. To provide stability to this mounting, another strip 90 may be tied between the tops of the interrupters 84, as shown. Electrical connection to the interrupters 84 from the circuit involved may be made by a bus 92 attached to the strip 90.

An upper end fitting 94 on the fuse 14 includes a prong 96, or other male member, selectively engageable with contacts 98 at a second end 99 of the interrupters 84. The upper end fitting 94 also includes a latching mechanism, generally designated at 100. When the interrupters 84 are in their normally conducting condition, an electrical path is completed via the bus 92, the strip 90, the first interrupter end 86, the interrupter 84, and the contacts 98.

When the fuse 14 is in the circuit between the contacts 98 and the terminals 82, the prong 96 is engaged by the contacts 98 completing a circuit through both the fuse 14 and the interrupter 84. If it is desired to interrupt the circuit, the latching mechanism 100 is operated permitting the fuse 14 to be rotated away from its associated interrupter 84. This movement initially moves the contacts 98 longitudinally of the interrupter 84 to effect circuit interruption therewithin. Ultimately, following circuit interruption by the interrupter 84, the prong 96 is released by the contacts 98 so that the fuse 14 comes to rest in a position rotated away from the interrupter 84. In this position, the fuse 14 is held in the lower fuse mounting 76.

As should be apparent, the interrupters 84 may be individually or together replaced by other structures, such as a member, conductive or not, attachable to the second support points 20 of the elements 12 and mounted to the second end 64 of the third insulator 58.

Figure 4:
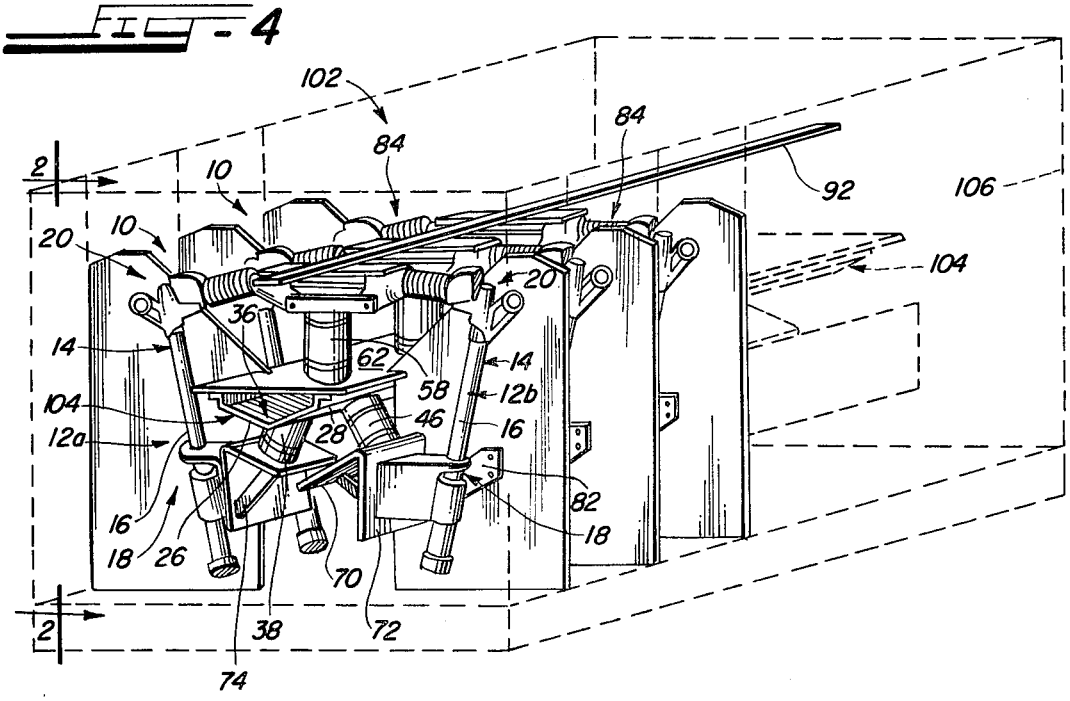
FIG. 4 is a partial perspective view of FIG. 2.

Referring now to FIGS. 2 and 4, there is shown a cluster 102 of the mounting assemblies 10, described above. The cluster 102 is especially useful for the similar side-by-side mounting of a plurality of pairs of electrical switching elements 12, such as the high-voltage fuses 14. There will be one assembly 10 for each pair of elements 12. Where such a cluster 102 is utilized, it is preferred that all of the elements 12 in each pair be similarly oriented. The preferred orientation of the preferred fuses 14 is with their lower end fittings 78 lowermost and their upper end fittings 94 uppermost. Clearly, however, other orientations could be selected, the pairs of fuses 14 need not all be similarly oriented, the fuses 14 may be of varying constructions, and the facilities 44, 52 and 66 may be the same or different.

In its preferred form, where the fuses 14 are similarly oriented, the cluster 102 includes an elongated dihedral channel member 104 similar in cross section to the channel member 24, but sufficiently long to commonly support each grouping of first, second and third insulators 38, 46 and 58. Instead of using a single elongated dihedral member 104, a plurality of individual dihedral members 24 may be used and may be commonly oriented, as by being bolted or welded directly together, or by being interconnected or otherwise maintained in a desired orientation by structural pieces.

The cluster 102 is preferred for use within a housing 106, which may take the form of a metallic cabinet having one or more doors, as is well known. Facilities within the cabinet support the cluster 102. When the preferred elongated dihedral member 104 is used, or when a series of individual dihedral members 24 mounted together are utilized, the supporting facilities may take one or more forms. Specifically, one preferred type of supporting facility is the welding of the longitudinal ends of the elongated dihedral member 104 to opposed walls of the housing 106. In the event that the cluster 102 assumes a rather long dimension and the weight borne thereby becomes rather substantial, additional mounting facilities may be used to ensure such weight does not distort the member 104 and to provide torsional stability thereto. A preferred form for such additional mounting facilities includes a vertical support beam 110 depending from the elongated channel member 104 and connected to or braced at the bottom of the housing 106. Where such a support beam 110 is utilized, and the elements 12, as well as the facilities 44, 52 and 66, are similar, it is preferred that there by an approximately equal number of elements 12 on each side thereof. Of course, since the prime consideration is the distribution of weight on the elongated channel member 104 on the beam 110, if the various pairs of elements 12 mounted by the cluster 102 vary and have different weights, the support beam 110 may be so positioned as to bear equal weight on either side thereof.

Although certain preferred embodiments of the present invention are described in the foregoing detailed description, it should be understood that this invention is not limited to those specific embodiments, but is capable of modification and rearrangement. For example, the dihedral members 24 or 104 may have other cross-sectional shapes from that shown. Such other shapes may take the form of circles or other polygons. More specifically, in addition to the structures shown in FIGS. 1 and 3, alternative cross-sections to that shown for the dihedral members 24 and 104 could be a six- or eight-sided polygon with an upper and a lower face oriented generally horizontally. In these cases, the two angular surfaces adjacent the bottom (or top) horizontal surface may take the place of, and serve the same function as, the planar faces 26 and 28, while the top (or bottom) horizontal surface may take the place of, and serve the same function as, the plate-like member 62. Accordingly, it should be clear that as used in this specification and the claims, the terms "central support member" or "dihedral member" means any structural member permitting the angular orientation and mounting of two insulators with respect to each other and the orientation and mounting of a third insulator with respect to the first two so that a generally Y-shaped, T-shaped or arrow-shaped configuration is achieved. Stated another way, the important functional aspect of the central support member 22 is that it permits the radial, outwardly extending mounting of three insulators thereto in wheel-spoke-like fashion and in such a manner that two of the insulators are unique to two of the supported elements, while the third insulator is shared by both elements.

I claim:

1. An assembly for mounting together in opposed fashion a pair of electrical switching elements, each of which has a first and a second support point, which assembly comprises:
    (a) a central support member;
    (b) first insulator means for partially supporting one element, the first insulator means having a first end mounted to the support member and, extending away therefrom, a second end to which the first support point of one of the elements is attachable;
    (c) second insulator means for partially supporting the other element, the second insulator means having a first end mounted to the support member and, extending away from the support member so that the second ends of the first and second insulator means diverge, a second end to which the first support point of the other element is attachable; and
    (d) third insulator means for partially supporting both elements, the third insulator means having a first end mounted to the support member diametrically remote from the first ends of the first and second insulator means, the third insulator means also having a second end both attachable to the second support points on both elements and extending away from the support member generally diametrically opposite from the direction of extension of the second ends of the first and second insulator means.

2. The assembly of claim 1, wherein the respective first and second ends of the insulator means define lines which generally describe a Y, the lines defined by the first and second ends of the first and second insulator means being the arms of the Y, the line defined by the first and second ends of the third insulator means being the base of the Y.

3. The assembly of claim 2, wherein the line defined by the ends of the third insulator means is the bisector of the angle included between the lines defined by the ends of the first and second insulator means.

4. The assembly of claim 3 which further comprises:
    a first angle piece having two legs, a first leg of which is connected to the second end of the first insulating means and is generally prependicular to the line defined by the ends of the first insulating means, a second leg of which is generally parallel to the bisector and is attachable to the first support point of the one element; and
    a second angle piece having two legs, a first leg of which is connected to the second end of the second insulating means and is generally perpendicular to the line defined by the ends of the second insulating means, a second leg of which is generally parallel to the bisector and is attachable to the first support point of the other element.

5. The assembly of claim 3 which further comprises:
    means on the second end of the third insulating means and attachable to the second support points of the elements for providing an electrically conductive path between the second support points.

6. The assembly of claim 5 wherein the elements are high-voltage fuses, disconnect switches or disconnect blades, and the conductive path-providing means comprises:
    a first hard-gas interrupter mounted at a first end to the second end of the third insulating means, the second end of the hard-gas interrupter being attachable to the second support point of one of the elements.

7. The assembly of claim 6 wherein the conductive path-providing means further comprises:
    a second hard-gas interrupter mounted at a first end to the second end of the third insulating means, the second end of the hard-gas interrupter being attachable to the second support point of the other elements.

8. The assembly of claim 4 for mounting elements having a hinge mounting at the first support point thereof, which assembly further comprises:
hinge means on each of the second legs of the angle piece for rotatably supporting the hinge mounting of respective elements.

9. The assembly of claim 8 wherein the elements are high-voltage fuses, disconnect switches or disconnect blades, which assembly further comprises:
a pair of hard-gas interrupters mounted at one end to the second end of the third insulating means, the other ends of the interrupters being respectively attachable to the second support points of the elements.

10. The assembly of claim 9 for mounting elements having a prong at the second support point thereof selectively engageable by the other ends of the hard-gas interrupters, movement of the prong away from the second other interrupter end due to rotation of the hinge mounting in the hinge means operating the interrupter, which assembly further comprises:
means for mechanically and electrically interconnecting the one end of the hard-gas interrupters.

11. A cluster for similar side-by-side mounting of a plurality of pairs of elements, which cluster includes a corresponding plurality of the assemblies set forth in claim 10, and which cluster further comprises:
means for similarly orienting each assembly so that the hinge means are lowermost and the other ends of the hard-gas interrupters are uppermost.

12. The cluster of claim 11 wherein the orienting means comprises:
an elongated central support member common to each element pair and to which each first, second and third insulator means is mounted.

13. The cluster of claim 12 which further comprises:
a multi-walled housing; and
means for supporting the cluster in the housing.

14. The housed cluster of claim 13 wherein the cluster supporting means comprises:
means for attaching the ends of the elongated central support member to opposed walls of the housing.

15. The housed cluster of claim 14 wherein the cluster supporting means further comprises a generally vertical support beam between the central support member and the housing, there being approximately an equal number of element pairs on either side of the beam.

16. An assembly for mounting together in opposed fashion a pair of electrical switching elements, each of which has a first and a second support point, which assembly comprises:
(a) a dihedral member;
(b) first insulator means for partially supporting one element, the first insulator means having a first end mounted to one planar face of the dihedral member and, extending away from the one planar face, a second end to which the first support point of one of the elements is attachable;
(c) second insulator means for partially supporting the other element, the second insulator means having a first end mounted to the other planar face of the dihedral member and, extending away from the other planar face so that the second ends of the first and second insulator means diverge, a second end to which the first support point of the other element is attachable; and
(d) third insulator means for partially supporting both elements, the third insulator means having a first end mounted to the dihedral member diametrically remote both from the first ends of the first and second insulating means and from the planar faces, the third insulator means also having a second end both attachable to the second support points on both elements and extending away from the dihedral member generally diametrically opposite from the direction of extension of the second ends of the first and second insulator means.

17. The assembly of claim 16 wherein
the dihedral member has an interior, whereat the angle of intersection of the planar faces is less than 180°, and an exterior, whereat the angle of intersection of the planar faces is greater than 180°.

18. The assembly of claim 17 wherein the second ends of the first and second insulator means extend perpendicularly away from their respective planar faces on the dihedral member's exterior, and the second end of the third insulator means extends away from the dihedral member's interior along the bisector of the angle of intersection.

19. The assembly of claim 18 which further comprises:
a plate spanning the dihedral member's interior and attached to the dihedral member perpendicularly to the bisector, the first end of the third insulator means being attached to the plate.

20. The assembly of claim 19 which further comprises:
a first angle piece having two legs, a first leg of which is connected to the second end of the first insulating means and is generally parallel to the one planar face, the second leg of which is generally parallel to the bisector and is attachable to the first support point of the one element; and
a second angle piece having two legs, one leg of which is connected to the second end of the second insulating means and is generally parallel to the other planar face, the other leg of which is generally parallel to the bisector and is attachable to the first support point of the other element.

21. The assembly of claim 20 wherein the elements are high-voltage fuses, disconnect switches or disconnect blades, which assembly further comprises:
means on the second end of the third insulating means attachable to the second support points of the elements for providing an electrically conductive path between the second support points.

22. The assembly of claim 21 for mounting elements having a hinge mounting at the first support point thereof, which apparatus further comprises:
hinge means on each of the second legs of the angle pieces for rotatably supporting the hinge mounting of respective elements.

23. The assembly of claim 22 for mounting elements having a prong at the second support point thereof, wherein the conductive path-providing means comprises a pair of hard-gas interrupters with which the prongs are respectively, selectively engageable, movement of the prongs away from their interrupters due to rotation of the hinge mounting in the hinge means operating the interrupter.

24. A cluster for similar side-by-side mounting of a plurality of pairs of elements which includes a corresponding plurality of the assemblies set forth in claim 23, and which further comprises:

means for similarly orienting each assembly so that the hinge means are lowermost and the hard-gas interrupters are uppermost.

25. The cluster of claim 24 wherein the orienting means comprises:
an elongated dihedral channel member common to each element pair and to which each first, second and third insulator means is mounted.

26. The cluster of claim 25 which further comprises:
a multi-walled housing; and
means for supporting the cluster in the housing.

27. The housed cluster of claim 26 wherein the cluster supporting means comprises:
means for attaching the ends of the elongated dihedral channel member to opposed walls of the housing.

28. The housed cluster of claim 27 wherein the cluster supporting means further comprises a vertical support beam between the elongated dihedral channel member and the housing, there being approximately an equal number of element pairs on either side of the beam.

29. An assembly for mounting electrical switching elements, each of which has a first and a second support point, which assembly comprises:
(a) a central support member;
(b) first insulator means for partially supporting one element, the first insulator means having a first end mounted to the support member and, extending away therefrom, a second end to which the first support point of one of the elements is attachable;
(c) second insulator means for partially supporting the other element, the second insulator means having a first end mounted to the support member and, extending away from the support member, a second end to which the first support point of the other element is attachable; and
(d) third insulator means for partially supporting both elements, the third insulator means having a first end mounted to the support member diametrically remote from the first ends of the first and second insulator means, the third insulator means also having a second end both attachable to the second support points on both elements and extending away from the support member in a direction different from the direction of extension of the second ends of the first and second insulator means.

30. The assembly of claim 29 wherein the second end of the third insulator means extends away from the support member generally diametrically opposite from the direction of extension of the second ends of the first and second insulator means.

31. An assembly for mounting electrical switching elements, each of which has a first and a second support point, which assembly comprises:
a central support member;
first insulator means for partially supporting one element, the first insulator means having a first end mounted to the support member and a second end extending away from the support member;
second insulator means for partially supporting the other element, the second insulator means having a first end mounted to the support member and a second end extending away from the support member;
third insulator means for partially supporting both elements, the third insulator means having a first end mounted to the support member and a second end extending away from the support member in a direction different from the direction of extension of the second ends of the first and second insulator means;
a first angle piece having two legs, a first leg of which is connected to the second end of the first insulating means and is generally perpendicular to the line defined by the ends of the first insulating means, a second leg of which is generally parallel to the line defined by the ends of the third insulating means and is attachable to the first support point of the one element;
a second angle piece having two legs, a first leg of which is connected to the second end of the second insulating means and is generally perpendicular to the line defined by the ends of the second insulating means, a second leg of which is generally parallel to the line defined by the ends of the third insulating means and is attachable to the first support point of the other element; and
means on the second end of the third insulating means and attachable to the second support points of the elements for selectively providing an electrically conductive path between the second support points.

* * * * *